No. 732,639. Patented June 30, 1903.

UNITED STATES PATENT OFFICE.

THOMAS B. JOSEPH, OF MERCUR, UTAH.

GOLD-EXTRACTING PROCESS.

SPECIFICATION forming part of Letters Patent No. 732,639, dated June 30, 1903.

Application filed June 21, 1902. Serial No. 112,562. (No specimens.)

*To all whom it may concern:*

Be it known that I, THOMAS B. JOSEPH, a citizen of the United States, residing at Mercur, in the county of Tooele and State of Utah, have invented certain new and useful Improvements in Gold-Extracting Processes; and I do declare the following to be a full, clear, and exact description of the invention, such as will enable others skilled in the art to which it appertains to make and use the same.

My invention relates to the extraction of precious metals, but more particularly to gold, and has for its object to extract gold from ore containing the same when in a suitable condition.

A further object of my invention is to provide a process for extracting precious metals which can be used on base, oxidized, or mixed ore, and which will not be neutralized by the presence of arsenic or sulfur, and which will leach both roasted and unroasted ores.

It must be understood that I cannot state definitely how fine the ore should be crushed, as loose-sand ore should be leached in its natural state, while soft ore should not be crushed as fine as hard or base ores, the fineness of crushing depending entirely upon the quality, impenetrability, and hardness of the ore to be leached.

In carrying out my invention after the ore has been crushed, as aforesaid, I subject the same to the leaching solution composed of water, cyanid of potassium, bromin, hydrate of calcium, peroxid of barium, and carbon dioxid, in conjunction with compressed air conveyed upward therein through the bottom from an air-compressor.

In carrying out my process such vessels as have been found to be most practical in the extracting of gold are used, although I prefer those made of wood, as metal will be more or less subject to the chemical action of the leaching solution, and I prefer to have the storage-tank standing at one side at a higher elevation than the ore-leaching tank, so that the leaching solution will run by the force of gravity into the tank containing the ore. The leaching solution, composed of water, cyanid of potassium, bromin, peroxid of barium, and hydrate of calcium, is prepared in the storage-tank, and when carbon dioxid is desired to be used the same may either be admitted and mixed with the solution in the storage-tank or with the solution in the leaching-tank containing the ore, or the peroxid-of-barium dust might be scattered on the ore accordingly as the latter is dumped into the ore-leaching tank, if so desired, instead of being added into the water in the storage-tank.

When carbon dioxid is used, the same may be obtained from burning limestone into oxid of lime, and the gas be conveyed therefrom by a pipe either into the solution in the leaching-tank or in the storage-tank, as desired, or it may be obtained from well-burned coal-smoke after the sulfur has been extracted from the smoke, or it might be obtained by using carbonated water, such as is used at soda-fountains, and it be conveyed into the leaching solution in like manner as above described.

The compressed air is conveyed into the tank of ore being leached in any approved manner for the purpose of agitating the ore as well as to help to convey the slimes, if any therein, toward the top, in order to aid the percolation of the solution through the ore and to neutralize the sulfur in the ore. Great care must be taken, however, not to admit the air under too-great pressure, as "channeling" might result, which would retard the leaching of the ore. Therefore compressed air should be turned on slowly and gradually increased to the desired amount. The carbon dioxid in the solution, moreover, neutralizes to some extent the alkalinity of the solution and helps to neutralize any sulfur on the ore, which would otherwise be injurious in a cyanid-of-potassium solution by tending to retain or precipitate the precious metals back into the tailings. The carbon dioxid also helps to more dissolve the hydrate of lime therein, and thereby more quickly conveys the same into the ore as soon as the solution can penetrate it to there form an insoluble compound composed of the lime hydrate and the sulfur or arsenic in either the ore or the solution, thereby preventing their injury to the cyanid solution and the cyanids of the precious metals.

Bromin in the solution will at once attack the cyanid of potassium and liberate the nascent cyanogen and form the cyanogen bromid therewith. If there were no free oxygen in the solution, a part of the bromin would combine with the potassium of the cyanid of potassium and form bromid of potassium; but free oxygen liberated from peroxid of barium in the solution by the water and from compressed air will again liberate the bromin from the bromid of potassium, which freed bromin will then join with the free cyanogen and form more cyanogen bromid. I might use the solid bromid; but I prefer to use the bromin in the liquid form and in about the proportion of one ounce to each ton of the solution, although I do not confine myself to any particular proportion, as some ores will require a larger or less amount of bromin, and also vary the proportions of the other chemicals in the solution.

As it is expedient to have free potassium cyanid present with the cyanogen bromid, it is advisable to remove the cyanid-destroying compounds either by washing with water before the leaching is commenced or else to use carbon dioxid, hydrate of calcium, peroxid of barium, and compressed air therein to neutralize the cyanid-destroying compounds.

Cyanogen bromid has far greater activity and power as a solvent to extract precious metals from the ore in the presence of free oxygen and hydrate of calcium in the alkaline solution than cyanogen has. If there is an excess of bromin present, then paracyanogen is formed; but experiments show that a weak solution of bromin is the most efficient.

It will be observed that while a very weak amount of carbon dioxid in water will precipitate calcium, yet a larger amount of carbon dioxid therein will dissolve calcium hydrate of the milk of lime the more and help to clarify the solution. I have found that carbon dioxid in this solution is of much more value in this connection than the bicarbonates of potassium, sodium, or ammonium, for the reason that too much of the alkalids of those metals would be injurious, because they would tend to dissolve base metals into the solution and foul it if the solution became too alkaline, as the ores are often quite alkaline.

In ores rich in sulfur, tellurium, antimony, bismuth, realgar, or orpiment I prefer to first extract the most of these elements by another leaching process of my own and then to afterward extract the precious metals, as herein stated; also, by reason of using this weaker solution of cyanid of potassium rather than the heretofore practice and the consequent weaker alkalinity therein then not so much of the zinc and iron would be dissolved therein to foul the solution, as was often the case heretofore with too strong an alkaline solution.

When it is desired to hasten the process of leaching or to prevent the solution from freezing in winter, the compressed air may be heated by a heating-furnace through which a coil of the air-pipe passes.

The oxygen liberated in the solution from peroxid of barium added therein, as well as the oxygen from the compressed air, will not only liberate the nascent cyanogen quickly, but they both will also furnish plenty of oxygen to assist the nascent cyanogen and the cyanogen bromid in their work, as well as to help to neutralize the injurious effects of sulfur in the ores, thereby facilitating the better extraction of gold from arsenical and sulfurous ores by the nascent cyanogen and cyanogen bromid in the alkaline solution Were it not for the hydrate of calcium, peroxid of barium, compressed air, and the cyanogen bromid in the solution some of the said ores would have to be roasted, thus making the process much more expensive, and consequently detracting from the value of the ores.

I wish to be understood as distinguishing between the use of hydrate of calcium and oxid of lime and lay no claim to the latter, for the reason that the dissolving of the same into the hydrate of calcium in the leaching liquor is so slow that the sulfur and arsenic in the ore will have injured the cyanid of potassium and cyanids of the precious metals before the oxid of lime is dissolved, thus rendering its use of little or no benefit to neutralize the sulfur and arsenic until after the said acids have done their harmful work. Hydrate of calcium, however, is thoroughly mixed with the leaching liquor before the same has been run in the ore, either upwardly or downwardly, to be leached. Hydrate of calcium, compressed air, peroxid of barium, and carbon dioxid in the solution immediately neutralize the most of the baseness or refractory nature of the ore, as lime would form an insoluble compound with the arsenic, while barium and sulfur would form the insoluble compound of barium sulfate, and the thus liberated oxygen from the barium peroxid would greatly aid the extraction of the precious metals.

The oxygen liberated from barium peroxid by the water also causes the pyrites to be oxidized to sulfate of iron and the gold to be set at liberty from the pyrites, which thereby causes the better extraction of the gold. The normal oxid of barium which is left after the above work is performed then decomposes the sulfate of iron in the solution, forming sulfate of barium and oxid of iron, both of which are insoluble. It also removes sulfur from the sulfocyanids and dispenses with the use of much of the lime oxid as heretofore has been customary to use. There should be more peroxid of barium added on pyritic or sulfurous than on free-milling ore.

As a general rule there should be about two and one-half pounds of cyanid of potassium added in each ton of water for the solution, though oftentimes a stronger or weaker solution will be found beneficial, as circumstances may require.

The addition thereto of the bromin, carbon dioxid, hydrate of calcium, peroxid of barium, and compressed air assists the leaching to such a degree that a less amount of cyanid of potassium can be used than heretofore has been the custom.

As a general rule there should be about one ounce of bromin added in each ton of water for the solution and about three ounces of liquid carbon dioxid to each ton of water, though oftentimes a lesser or larger amount of either or both might be found beneficial.

The solution should also contain about one pound of oxid of lime dissolved into the hydrate of calcium to each ton of the solution in addition to any dust of oxid of lime that might be added or scattered into the ore when the latter is dumped into the tank to be leached to sweeten the same to prevent any bad odor that might afterward occur when emptying out the tailings.

There should be about one-half of a pound of peroxid of barium added to each ton of water for the solution for the average ore; but some ores containing more sulfur would require a larger amount to neutralize the sulfur in the ore, while some free-milling ore would do with a less amount of peroxid of barium.

After the ore is leached the solution is drained off into another tank, from whence it may be drained through boxes containing zinc-shavings or charcoal, or both, for the precious metals to be precipitated thereon, or the precious metals may be precipitated from the solution by electricity or with zinc-dust stirred therein, though I prefer to use zinc-dust. The leaching liquor can then be pumped from there or from a sump-tank when run into it or from the gold-solution tank without any precipitation of its metals, back to the storage-tank, if desired, to there be replenished to the desired quantity and strength in order to use again to leach same or other ore.

When desiring to finish up a tank of leaching ore, a wash-water should be run through it to wash out as much as is convenient of the remaining cyanids of the precious metals as may have remained therein and be saved to again use as a wash-water or to replenish the quantity of the strong solution. In this way the wash-water may be used over and over again as often as desired, the pipes connecting the different tanks and pumps being provided with stop-cocks, so as to control and regulate the flow of the leaching liquor and also the compressed air.

I lay no claim to the apparatus, nor do I claim, broadly, the use of compressed air nor any particular mode of precipitation of the precious metals, nor do I wish to be understood as claiming an alkaline earth in the solution—as potassium, sodium, or ammonium—but confine myself to hydrate of calcium, for the reason the aforementioned earths being alkaline are injurious, especially as they help to dissolve base metals in the solution, and thereby to foul it, while the hydrate of calcium and peroxid of barium neutralize the base acids of sulfur and arsenic, if any therein, and thus prevent the sulfur and arsenic from fouling the solution and also prevent the ore acids of sulfur and arsenic from attacking the cyanids of the precious metals and precipitating them back into the tailings.

What I claim as new, however, and desire to secure by Letters Patent of the United States, is—

1. The herein-described process of extracting gold and silver from ore containing the same, when in a suitable condition, which consists in subjecting the said ore to the leaching action of a solution containing water, cyanid of potassium, bromin, hydrate of calcium, peroxid of barium and carbon dioxid, and simultaneously agitating the ore, by compressed air being forced upward through the same, substantially as described.

2. The herein-described process of extracting gold and silver from ore containing the same, when in a suitable condition, which consists in subjecting said ore to a leaching action of a solution containing water, cyanid of potassium, bromin, hydrate of calcium, peroxid of barium and carbon dioxid, said carbon dioxid being forced into the leaching solution, simultaneously with compressed air, as and for the purpose set forth.

3. The herein-described process of extracting gold and silver from ore containing the same when in a suitable condition, which consists in subjecting the said ore to the leaching action of a solution containing water, cyanid of potassium, bromin, hydrate of calcium, peroxid of barium, and simultaneously agitating the ore by compressed air.

4. The herein-described process of extracting gold and silver from ore containing the same when in a suitable condition, which consists in subjecting the said ore to the leaching action of a solution of water, cyanid of potassium, bromin, hydrate of calcium, and peroxid of barium.

5. The herein-described process of extracting gold and silver from ore containing the same, when in suitable condition, which consists in subjecting the said ore to the leaching action of a solution containing water, cyanid of potassium, bromid and peroxid of barium.

In testimony whereof I affix my signature in presence of two witnesses.

THOMAS B. JOSEPH.

Witnesses:
  ELLA PATTEN,
  CHRISSIE JOHNSON.